US010461675B2

(12) United States Patent
Ishikawa

(10) Patent No.: US 10,461,675 B2
(45) Date of Patent: Oct. 29, 2019

(54) CONTROL DEVICE, OPTICAL APPARATUS, CONTROL METHOD, AND STORAGE MEDIUM

(71) Applicant: CANON KABUSHIKI KAISHA, Tokyo (JP)

(72) Inventor: Daisuke Ishikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/975,260

(22) Filed: May 9, 2018

(65) Prior Publication Data

US 2018/0331641 A1 Nov. 15, 2018

(30) Foreign Application Priority Data

May 10, 2017 (JP) .................. 2017-093591

(51) Int. Cl.
*H02P 8/18* (2006.01)
*H02P 6/15* (2016.01)
*H02P 8/22* (2006.01)

(52) U.S. Cl.
CPC ................ *H02P 8/18* (2013.01); *H02P 6/153* (2016.02); *H02P 8/22* (2013.01)

(58) Field of Classification Search
CPC .... H02P 8/14; H02P 6/153; H02P 8/18; H02P 8/22; H04N 5/2254; H04N 5/2353
See application file for complete search history.

(56) References Cited

U.S. PATENT DOCUMENTS

| 5,213,080 | A | 5/1993 | Lambert et al. | |
|---|---|---|---|---|
| 5,856,893 | A * | 1/1999 | Mizutani | G11B 20/10 360/70 |
| 6,870,346 | B2 | 3/2005 | Davidov | |
| 7,085,200 | B2 * | 8/2006 | Okada | G11B 7/08529 369/30.1 |
| 2006/0012324 | A1 * | 1/2006 | Eskritt | B62D 5/065 318/437 |
| 2013/0249456 | A1 * | 9/2013 | Inoue | H02P 6/153 318/400.14 |

(Continued)

FOREIGN PATENT DOCUMENTS

JP 4165915 B2 10/2008
JP 2014039427 A 2/2014

(Continued)

*Primary Examiner* — Rina I Duda

(74) *Attorney, Agent, or Firm* — Canon U.S.A., Inc. IP Division

(57) ABSTRACT

A control device includes at least one processor which functions as an advance angle detection unit, a storage unit configured to store information indicating a plurality of loci each indicating a relationship between the advance angle and a rotation speed of a rotor at each driving voltage, a target advance angle calculation unit configured to calculate a target advance angle based on the information, an advance angle control unit, a voltage control unit, and a switching unit configured to switch between a first control state for setting a target rotation speed by controlling the advance angle along one locus among the plurality of loci and a second control state for setting the target rotation speed by controlling the voltage in a state where the advance angle is fixed, according to the locus, the target advance angle, and the driving voltage.

20 Claims, 16 Drawing Sheets

(56) References Cited

U.S. PATENT DOCUMENTS

2013/0320892 A1* 12/2013 Inoue ..................... H02P 6/153
                                                    318/400.14
2015/0022139 A1*  1/2015 Yamanaka ............... H02P 8/14
                                                    318/696

FOREIGN PATENT DOCUMENTS

| JP | 2015023682 A | 2/2015 |
| JP | 2015023695 A | 2/2015 |
| JP | 2015023703 A | 2/2015 |
| JP | 6004830 B2 | 10/2016 |
| JP | 2017134269 A | 8/2017 |

* cited by examiner

CONTROL DEVICE, OPTICAL APPARATUS, CONTROL METHOD, AND STORAGE MEDIUM

BACKGROUND

Field of the Disclosure

The present disclosure relates to a device for controlling a stepping motor.

Description of the Related Art

Optical apparatuses such as an imaging apparatus are each equipped with a stepping motor, and various kinds of driving methods have been proposed for the stepping motor. In the stepping motor, high resolution can be easily obtained with open loop control, thanks to microstepping driving that uses a sine wave as a control waveform. Therefore, in general, the stepping motor is driven by the open loop control.

Meanwhile, the stepping motor may step out when rotating at a high speed. To address this issue, advance angle control has been discussed. The advance angle control is performed to rotate the stepping motor at a high speed while avoiding step-out of the stepping motor. To this end, a mechanism for detecting the rotation position of the stepping motor is provided, and the phase of the control waveform is advanced by a predetermined angle.

Japanese Patent Application Laid-Open No. 2015-23703 discusses a control device for accelerating a stepping motor without causing step-out, by performing advance angle control and voltage control. Japanese Patent No. 6004830 discusses a control device for storing a relationship between an advance angle and a speed as an approximate expression, and shifting the relationship according to a voltage.

However, in some cases, it is difficult to smoothly accelerate and decelerate the stepping motor discussed in each of Japanese Patent Application Laid-Open No. 2015-23703 and Japanese Patent No. 6004830 while ensuring a dynamic range.

SUMMARY OF THE DISCLOSURE

Accordingly, the present disclosure is directed to providing a control device, an optical apparatus, a control method, and a storage medium for allowing smooth acceleration and deceleration, while ensuring a dynamic range of the rotation speed of a stepping motor.

According to an aspect of the present disclosure, a control device includes at least one processor which functions as a generation unit configured to generate a detection signal for a rotation position of a rotation portion of a stepping motor, a rotation speed detection unit configured to detect a rotation speed of the rotation portion, an advance angle detection unit configured to detect an advance angle based on the detection signal and a control waveform, a storage unit configured to store information indicating a plurality of loci each indicating a relationship between the advance angle and the rotation speed at each driving voltage, a target advance angle calculation unit configured to calculate a target advance angle depending on a target rotation speed of the rotation portion, based on the information stored in the storage unit, an advance angle control unit configured to control the advance angle to be the target advance angle, a voltage control unit configured to control the driving voltage of the stepping motor, based on the information stored in the storage unit, and a switching unit configured to switch between a first control state and a second control state, wherein the target advance angle calculation unit sets a target rotation speed by controlling the advance angle along one locus among the plurality of loci, in the first control state, wherein the voltage control unit sets the target rotation speed by controlling the voltage in a state where the advance angle is fixed, in the second control state, and wherein the switching unit switches between the first control state and the second control state, according to the locus, the target advance angle, and the driving voltage.

Further features of the present disclosure will become apparent from the following description of exemplary embodiments with reference to the attached drawings.

DESCRIPTION OF THE EMBODIMENTS

Exemplary embodiments of the present disclosure will be described in detail below with reference to the drawings.

Figure 1:
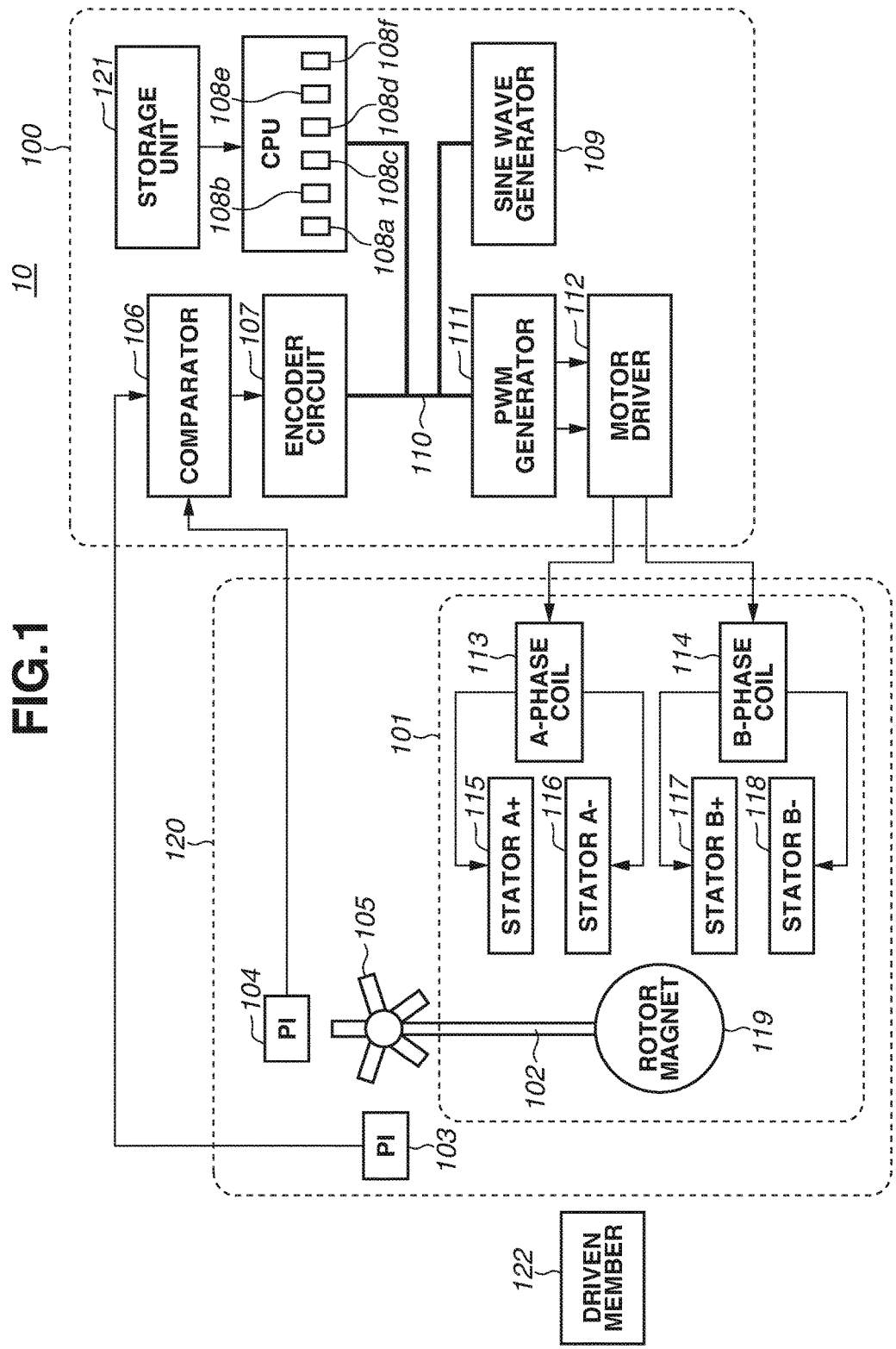
FIG. 1 is a block diagram illustrating a motor control system according to one exemplary embodiment of the subject disclosure.

A first exemplary embodiment will be described. If an advance angle is increased in controlling the rotation of a stepping motor, controllability for the rotation speed of the stepping motor decreases and tolerance to load variation declines. This results in an unstable state of the speed of the stepping motor. To avoid this issue, a shift to voltage control may be performed with a small advance angle, by using a control device discussed in Japanese Patent Application Laid-Open No. 2015-23703. However, even if this shift is performed, a sufficient dynamic range cannot be obtained in a case where the upper limit of a voltage to be applied to the stepping motor has been determined. Meanwhile, in a control device discussed in Japanese Patent No. 6004830, controllability decreases, in a case where an approximate expression is switched based on a voltage when a relationship between an advance angle and a speed collapses due to a variation in load such as temperature and orientation difference. Therefore, in the present exemplary embodiment, a control device, an optical apparatus, a control method, and a program for allowing smooth acceleration and deceleration while ensuring a dynamic range will be described. First, a configuration of a motor control system according to the first exemplary embodiment of the present disclosure will be described with reference to FIG. 1. FIG. 1 is a block diagram illustrating a motor control system 10 according to the present exemplary embodiment. The motor control system 10 includes a control device 100 and a stepping motor unit 120. The control device 100 controls the stepping motor unit 120.

The control device 100 controls the rotation of a stepping motor 101 while detecting a rotation position of the stepping motor (a motor) 101. The control device 100 has a function of controlling the advance angle by using advance angle data depending on a rotation speed of the stepping motor 101, and a function of controlling the speed of the stepping motor 101 based on a driving voltage.

The stepping motor unit 120 includes the stepping motor 101, a rotor shaft 102, a pulse plate 105, and photo interrupters (PIs) 103 and 104. The stepping motor unit 120 has a position detection function. In the present exemplary embodiment, an encoder is described as an example. In this encoder, the pulse plate 105 is provided at the rotor shaft 102 of the stepping motor 101 that is provided in the stepping motor unit 120. The stepping motor 101 drives a driven member 122. The driven member 122 is, for example, a lens provided in a lens unit or an imaging apparatus. In this case, when the stepping motor 101 rotates, the lens serving as the driven member 122 moves in an optical axis direction. However, the present exemplary embodiment is not limited to this example. The stepping motor 101 can also drive a driven member other than the lens.

Figure 2:
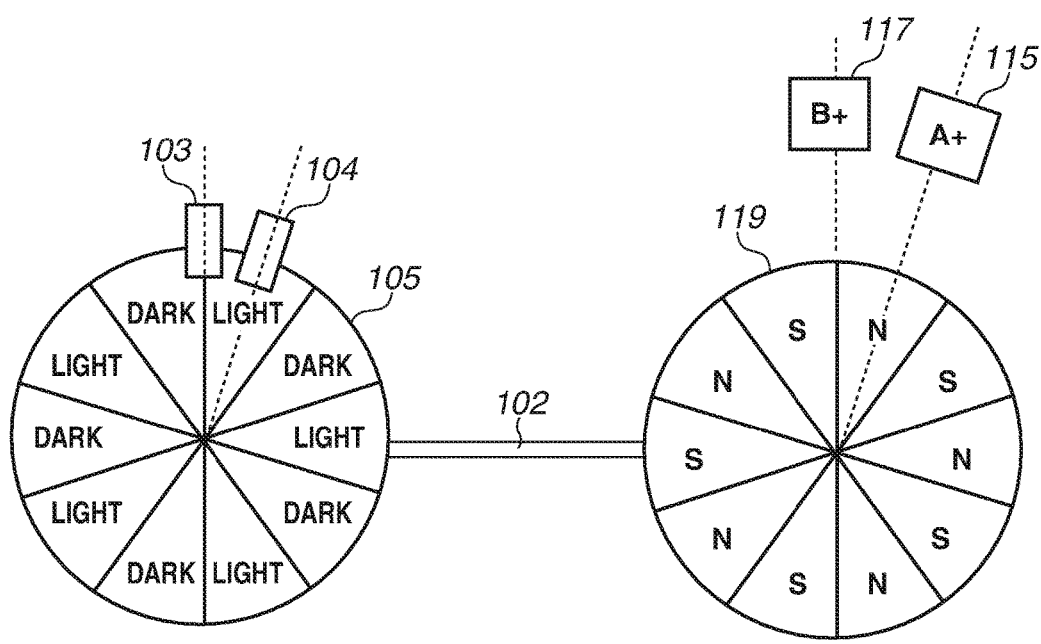
FIG. 2 is a configuration diagram illustrating a stepping motor unit according to one exemplary embodiment of the subject disclosures.
Figure 3:
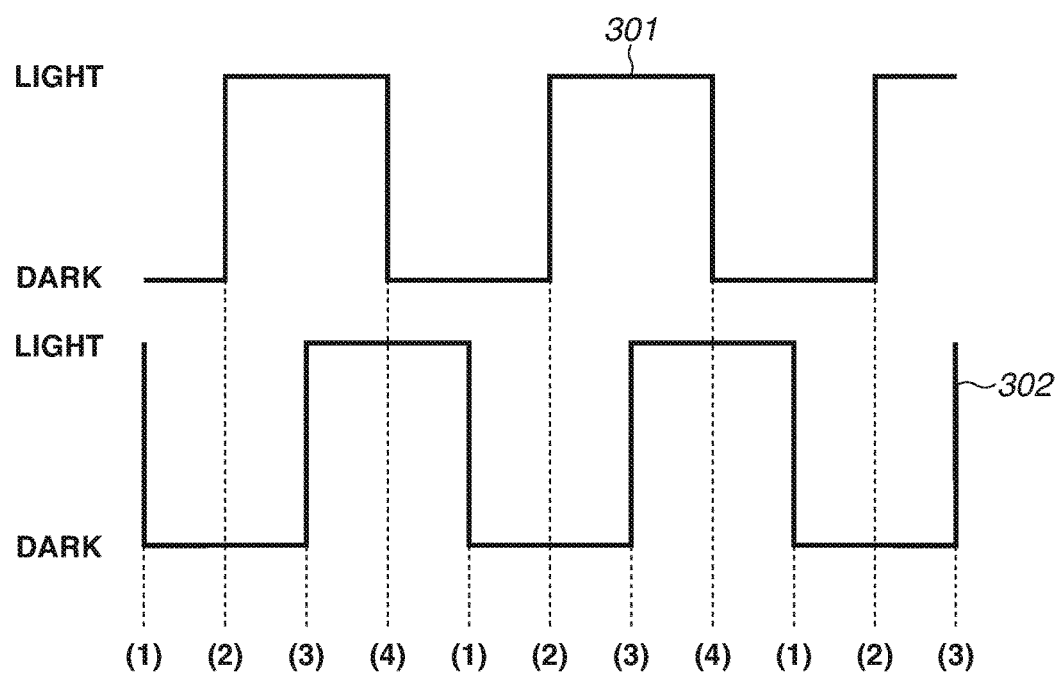
FIG. 3 illustrates a signal from an encoder according to one exemplary embodiment of the subject disclosure.

FIG. 2 is a configuration diagram illustrating the stepping motor unit 120. The pulse plate 105 is designed in such a manner that the ratio between light areas and dark areas is 50:50. The two PIs 103 and 104 are each attached to a mechanically designed position in the stepping motor 101. In a state illustrated in FIG. 2, N areas of the rotor shaft 102 coincide with the "light" areas of the pulse plate 105, and S areas of the rotor shaft 102 coincide with the "dark" areas of the pulse plate 105. A two-phase encoder is configured by combining the PIs 103 and 104 with the pulse plate 105. In the above-described configuration, the pulse plate 105 changes light and dark output signals of the PIs 103 and 104 as the rotor shaft 102 rotates, and thereby a two-phase rectangular signal (signals 301 and 302) is generated. FIG. 3 illustrates a signal of the encoder (the signals 301 and 302 each being a binaized signal from the encoder).

As illustrated in FIG. 1, the control device 100 includes a comparator 106, an encoder circuit 107, a central processing unit (CPU) 108, a sine wave generator 109, a pulse width modulation (PWM) generator 111, a motor driver 112, and a memory (a storage unit) 121. The comparator 106 receives an analog signal output from each of the PIs 103 and 104, and outputs the binary signals 301 and 302 of two phases illustrated in FIG. 3 to a subsequent stage according to a set threshold voltage. The comparator 106 thus functions as a unit for generating a detection signal for a rotation position of the rotor shaft 102 attached to a rotation portion (a rotor) of the stepping motor 101. The signal obtained by binarizing the signal from each of the PIs 103 and 104 is output to the encoder circuit 107.

The encoder circuit 107 acquires the timing of each of a rise and a fall of a signal. Further, in synchronization with the timing, the encoder circuit 107 performs position counting and signal period counting of the stepping motor 101. The encoder circuit 107 can also perform interruption processing for the CPU 108 at signal-input timing. The CPU 108 has a function of executing a program stored beforehand, and sequentially executes the program according to the interruption processing performed by the encoder circuit 107.

In the present exemplary embodiment, the CPU 108 has a rotation speed detection unit 108a, an advance angle detection unit 108b, a target advance angle calculation unit 108c, an advance angle control unit 108d, a voltage control unit 108e, and a switching unit 108f, i.e., the CPU 108 has the function of each of these units. The rotation speed detection unit 108a detects a rotation speed of the rotation portion (the rotor). The advance angle detection unit 108b detects an advance angle, based on a detection signal and a control waveform (a control signal) generated by the comparator 106. The target advance angle calculation unit 108c calculates a target advance angle depending on a target rotation speed of the rotation portion, based on information (an advance-angle-to-speed characteristic curve) indicating the relationship between an advance angle and a rotation speed at each driving voltage and stored in the memory 121. The advance angle control unit 108d controls an advance angle to be the target advance angle. The voltage control unit 108e controls the driving voltage of the stepping motor 101 to allow a deviation between the target rotation speed and the detected rotation speed of the rotation portion to fall within a predetermined range, based on the information stored in the memory 121. Further, the voltage control unit 108e controls the driving voltage, based on the information stored in the memory 121, the rotation speed of the rotation portion, and the target rotation speed.

The CPU 108 also controls the encoder circuit 107, the sine wave generator 109, and the PWM generator 111, via a bus 110. The sine wave generator 109 outputs a PWM value to the PWM generator 111, with resolution corresponding to one period of a sine wave, according to an instruction from the CPU 108. The PWM generator 111 generates a PWM signal according to the PWM value, and outputs the PWM signal to the motor driver 112. The motor driver 112 amplifies the PWM signal and outputs the amplified PWM signal to the stepping motor unit 120 (the stepping motor 101).

The motor driver 112 controls an output voltage according to a DUTY ratio (%) of PWM, and effectively applies a voltage signal in sine-wave form to coils (an A-phase coil 113 and a B-phase coil 114) of the stepping motor unit 120. To simplify the description, a voltage to be applied to the coil is handled as a sine wave. The rotation speed of the stepping motor 101 is controlled by the application of the voltage signal in sine-wave form. In this way, the CPU 108, the sine wave generator 109, the PWM generator 111, and the motor driver 112 that are combined function as a motor control unit for controlling the rotation speed of the stepping motor 101 at the timing depending on the detection signal of the rotor shaft 102.

The A-phase coil 113 and the B-phase coil 114 included in the stepping motor 101 receive a voltage signal in sine-wave form from the motor driver 112. The A-phase coil 113 and the B-phase coil 114 generate different sine wave voltages of four kinds of phase, for a stator A+ 115, a stator A− 116, a stator B+ 117, and a stator B− 118 in a subsequent stage. Assume that a sine wave is output to the A-phase coil 113, and a cosine wave is output to the B-phase coil 114. In case, if the B phase is a waveform preceding the A phase by 90 degrees, and the stepping motor 101 (the rotor shaft 102) rotates forward. Conversely, if a waveform lagging behind the A phase by 90 degrees is output to the B phase, the stepping motor 101 rotates in reverse.

There will be described a case where a rotor magnet (rotor) 119 and the pulse plate 105 of the encoder are affixed to each other in such a manner that the light and dark phases of the pulse plate 105 coincide with the magnetization phases of the rotor magnet (rotor) 119. If a phase shift amount between the magnetization phases of the rotor magnet 119 and the light and dark phases of the pulse plate 105 of the encoder is known, equivalent control can be performed in consideration of the phase shift amount.

Figure 4:
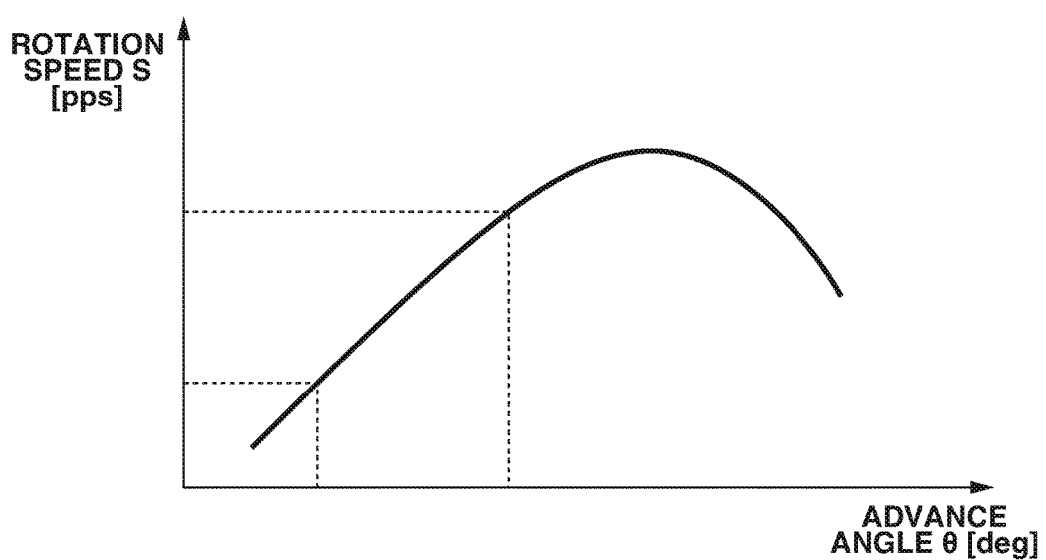
FIG. 4 illustrates a relationship between an advance angle and a rotation speed according to one exemplary embodiment of the subject disclosure.
Figure 5:
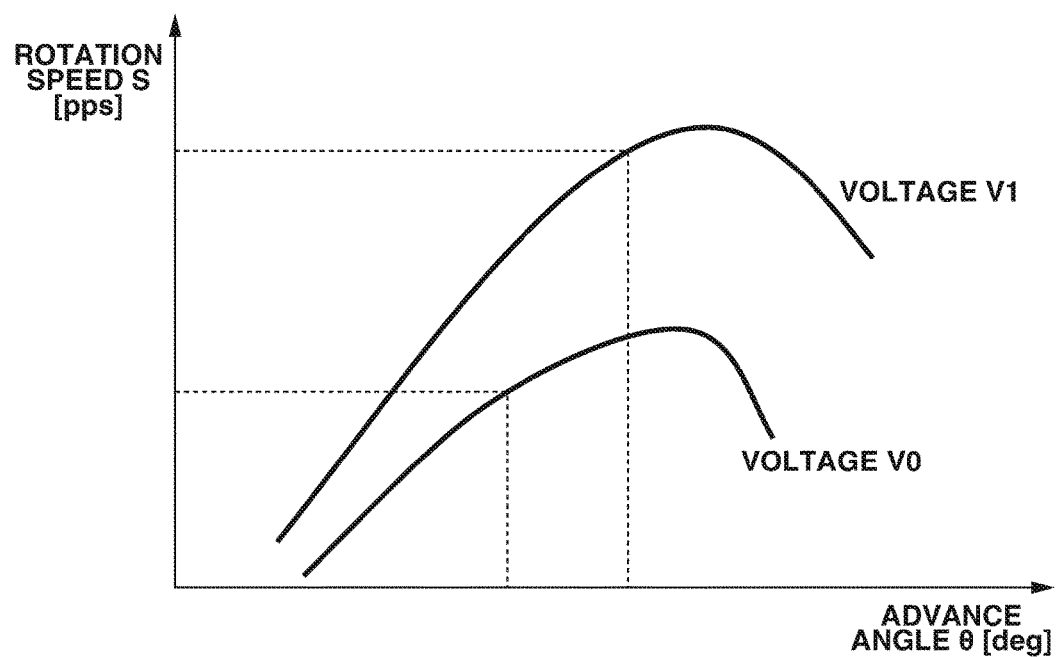
FIG. 5 illustrates a relationship between an advance angle and a rotation speed at each driving voltage according to one exemplary embodiment of the subject disclosure.

Next, the relationship between the advance angle and the rotation speed of the stepping motor 101 will be described with reference to FIG. 4 and FIG. 5. FIG. 4 illustrates the relationship between the advance angle and the rotation speed of the stepping motor 101 at a predetermined driving voltage. FIG. 5 illustrates the relationship between the advance angle and the rotation speed of the stepping motor 101 at each driving voltage. In each of FIG. 4 and FIG. 5, the horizontal axis indicates an advance angle θ [deg], and the vertical axis indicates a rotation speed S [pps]. A locus indicating the relationship between the advance angle and the speed on the graph in FIG. 4 or FIG. 5 may be hereinafter referred to as an advance-angle-to-speed characteristic curve.

As illustrated in FIG. 4 and FIG. 5, the driving speed (the rotation speed) decreases when the advance angle is reduced (in a leftward direction in FIG. 4 and FIG. 5). On the other hand, the driving speed (the rotation speed) increases when the advance angle is enlarged (in a rightward direction in FIG. 4 and FIG. 5). However, the driving speed (rotation speed) decreases when the advance angle exceeds a predetermined advance angle. Such correlation information (advance-angle-to-speed data) indicating the correspondence between the advance angle and the speed can be measured and stored in the control device 100 as a table. An advance angle value to be a target can be thereby calculated even if an arbitrary speed is specified and driving is performed based the specified speed. In the present exemplary embodiment, as illustrated in FIG. 5, a plurality of pieces of advance-angle-to-speed data each corresponding to each voltage (voltages V0 and V1) is stored as a plurality of pieces of table data. Then, a piece of table data is selected according to the rotation speed S to be a target (a target speed) and the advance angle θ to be a target (a target advance angle). As illustrated in FIG. 5, the rotation speed is higher as the voltage is higher, for the same advance angles.

Figure 6:
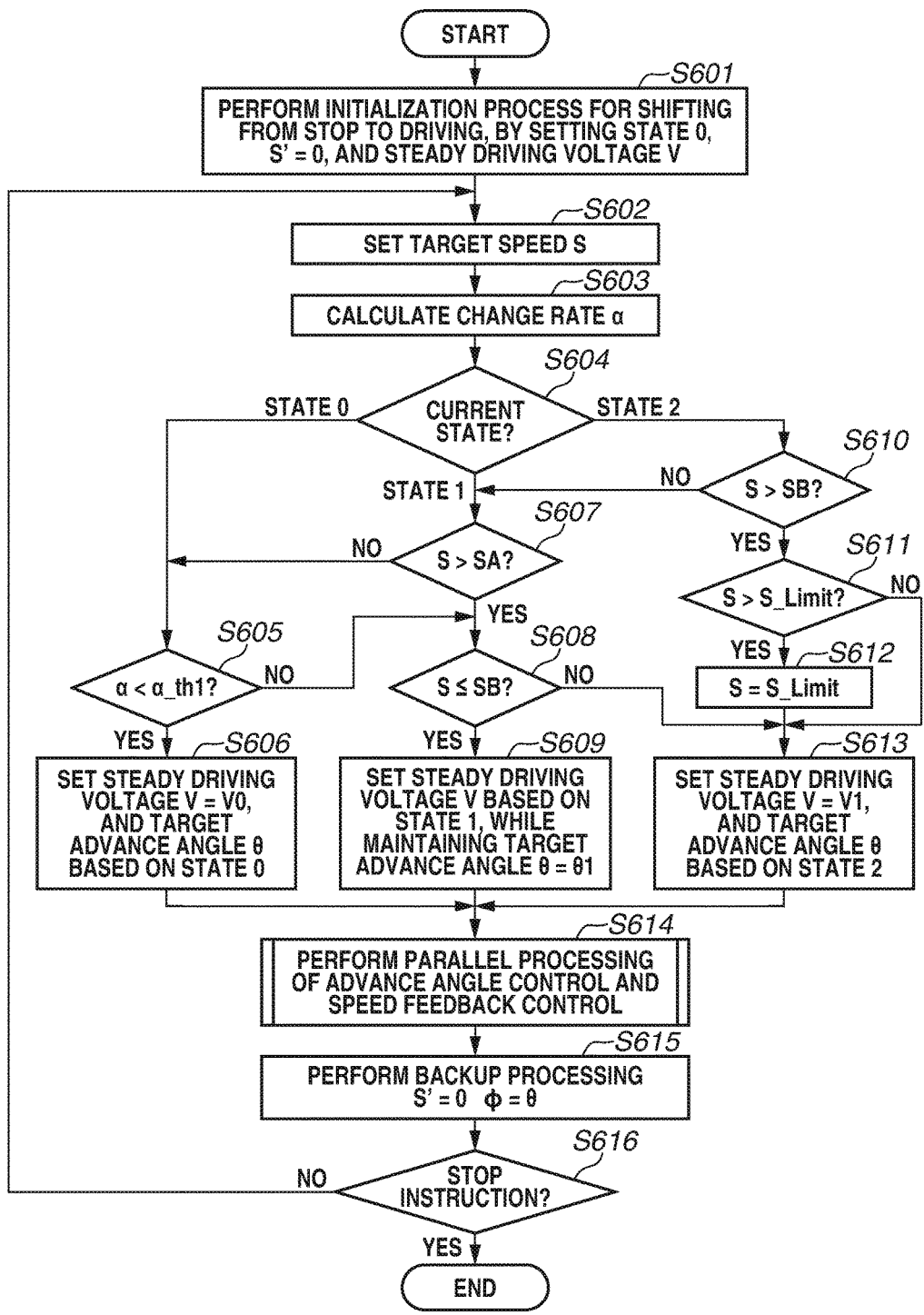
FIG. 6 is a flowchart illustrating a control method according to an exemplary embodiment of the subject disclosure.
Figure 7:
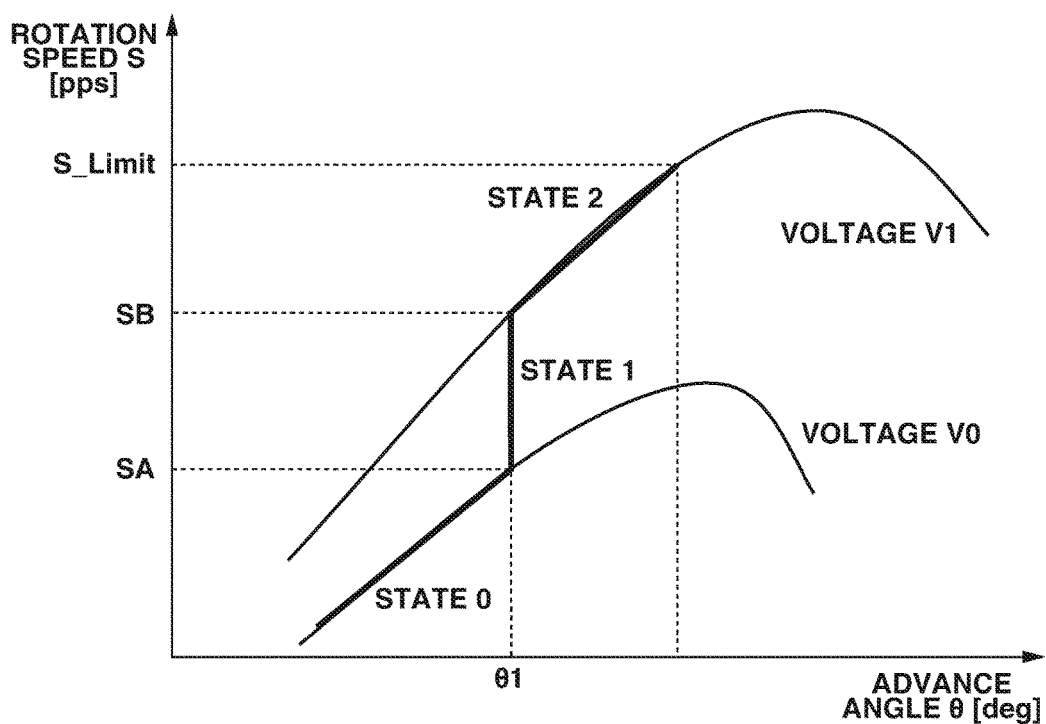
FIG. 7 illustrates a control state according to an exemplary embodiment of the subject disclosure.

Next, operation (a control method) of the control device 100 in the present exemplary embodiment will be described with reference to FIG. 6 and FIG. 7. FIG. 6 is a flowchart illustrating the control method in the present exemplary embodiment. Mainly, the CPU 108 of the control device 100 executes each step in FIG. 6. FIG. 7 illustrates control states in the present exemplary embodiment.

In the present exemplary embodiment, the control states include a state 0 (a first control state), a state 1 (a second control state), and a state 2 (the first control state), as illustrated in FIG. 7. The state 0 (the first control state) is a state where the target speed S is set by controlling the advance angle along the advance-angle-to-speed characteristic curve of the voltage V0. The state 1 (the second control state) is a state where the target speed S is set at up to SB by controlling the voltage while fixing the advance angle at θ1. The state 2 (the first control state) is a state where the target speed S is set by controlling the advance angle along the advance-angle-to-speed characteristic curve of the voltage V1. The switching unit 108*f* in the CPU 108 performs switching between the control states. The switching unit 108*f* switches one state to another state, according to a change rate α of speed to be described below, and the rotation speed S.

First, in step S601 in FIG. 6, the CPU 108 performs an initialization process for shifting from a stopped state to a driven state of the stepping motor 101. Here, because the stepping motor 101 is stopped, a backup speed S' that is a target speed in the previous control is set to 0, the control state is set to the state 0, and the driving voltage is set to a steady driving voltage V.

Next, in step S602, the CPU 108 sets the target speed S that is a rotation speed to be a target. Subsequently, in step S603, based on the advance-angle-to-speed data stored in the memory (the storage unit) 121, the CPU 108 calculates the change rate α (that is a change in rotation speed with respect to a change in advance angle, and may also be referred to as the slope of a locus) of speed, at the steady driving voltage V and the target advance angle θ that are currently set.

Processing from step S604 to step S613 is performed to set the steady driving voltage V and the target advance angle θ according to the control state (the states 0 to 2). The steady driving voltage V is a steady driving voltage for driving the stepping motor 101 at a predetermined target speed in speed feedback control to be described below.

First, in step S604, the CPU 108 determines the current control state. If the CPU 108 determines that the current control state is the state 0 (the first control state), the operation proceeds to step S605. In step S605, the CPU 108 determines the state of the change rate α of the advance-angle-to-speed data. In other words, the CPU 108 determines whether the change rate α is less than a threshold α_th1. If the change rate α is equal to or more than the threshold α_th1 (NO in step S605), the operation proceeds to step S608. This switches first control for the state 0 to second control for the state 1. On the other hand, if the change rate α is less than the threshold α_th1 (YES in step S605), the operation proceeds to step S606. In addition to the above-described threshold-based determination, the CPU 108 may perform control in such a manner that the operation proceeds to step S606 if a variation between the latest change rate α and the last change rate α' is less than a predetermined value X. In step S606, the CPU 108 performs processing for the state 0, i.e., the CPU 108 sets the steady driving voltage V at V0, and sets the target advance angle θ based on the advance angle-to-speed data concerning the voltage V0 and stored as the table data.

If the CPU 108 determines that the current control state is the state 1 (the second control state) in step S604, the operation proceeds to step S607. In step S607, the CPU 108 determines whether the target speed S is more than a speed SA. In the present exemplary embodiment, the speed SA is a predetermined speed on the advance-angle-to-speed data, which is the table data, concerning the voltage V0. The speed SA corresponds to the target speed S when the state 0 is switched to the state 1. If the target speed S is equal to or less than the speed SA (NO in step S607), the operation proceeds to step S605. The second control for the state 1 is thereby switched to the first control for the state 0.

On the other hand, if the target speed S is more than the speed SA (YES in step S608), the operation proceeds to step S608. In step S608, the CPU 108 determines whether the target speed S is equal to or less than a speed SB. In the present exemplary embodiment, the speed SB is a speed on the advance-angle-to-speed data, which is table data, concerning the voltage V1. The speed SB corresponds to the target speed S at which the state 1 is switched to the state 2. If the target speed S is more than the speed SB (NO in step S608), the operation proceeds to step S613. The second control for the state 1 is thereby switched to the first control for the state 2. On the other hand, if the target speed S is equal to or less than the speed SB (YES in step S608), the operation proceeds to step S609. In step S609, the CPU 108 performs processing for the state 1. Specifically, the CPU 108 sets the target advance angle θ to the advance angle θ1 (i.e., the current advance angle) which is the advance angle at the time of switching the state 0 to the state 1, and then sets the steady driving voltage V based on the target speed S and the table data of the state 1. The table data of the state 1 is table data, which is stored in advance, indicting the relationship between the target speed S and the steady driving voltage V in a state where the advance angle is fixed at θ1. In a case where a difference due to a variation in load occurs between the target speed S and the actual driving speed, the voltage feedback control in step S 614 to be described below is performed to bring the driving speed close to the target speed S. The advance angle θ1 is an angle when the rotation speed reaches the speed SA at the voltage V0.

If the CPU 108 determines that the current control state is the state 2 (the first control state) in step S604, the operation proceeds to step S610. In step S610, the CPU 108 determines whether the target speed S is more than the speed SB. If the target speed S is equal to or less than the speed SB (NO in step S610), the operation proceeds to step S607. The first control for the state 2 is thereby switched to the second control for the state 1. On the other hand, if the target speed S is more than the speed SB (YES in step S610), the operation proceeds to step S611. In step S611, the CPU 108 determines whether the target speed S is more than a limit threshold S_Limit. If the target speed S is more than the limit threshold S_Limit (YES in step S611), the operation proceeds to step S612. In step S612, the CPU 108 sets the target speed S at the limit threshold S_Limit, i.e., the CPU 108 performs limit processing, and the operation proceeds to step S613. On the other hand, if the target speed S is equal to or less than the limit threshold S_Limit (NO in step S611), the operation proceeds to step S613. In step S613, the CPU 108 performs processing for the state 2. Specifically, the CPU 108 sets the steady driving voltage V at V1, and sets the target advance angle θ, based on the advance-angle-to-speed data concerning the voltage V1 and stored as the table data illustrated in FIG. 7.

Upon completion of any of step S606, step S609, and step S613, the operation proceeds to step S614. In step S614, the CPU 108 performs parallel processing of advance angle control and speed feedback control, thereby controlling the rotation speed of the stepping motor 101 to be the target speed S. The parallel processing of the advance angle control and the speed feedback control will be described below.

Next, in step S615, the CPU 108 performs control-data backup processing. In other words, the CPU 108 stores the target speed S as S' and the target advance angle θ as φ into the storage unit, and the operation proceeds to step S616. In step S616, the CPU 108 determines whether a stop instruction is received. If the CPU 108 determines that a stop instruction is not received (NO in step S616), the operation returns to step S601, and the series of steps are repeated. On the other hand, if a stop instruction is received (YES in step S616), the CPU 108 stops the stepping motor 101.

Figure 8:
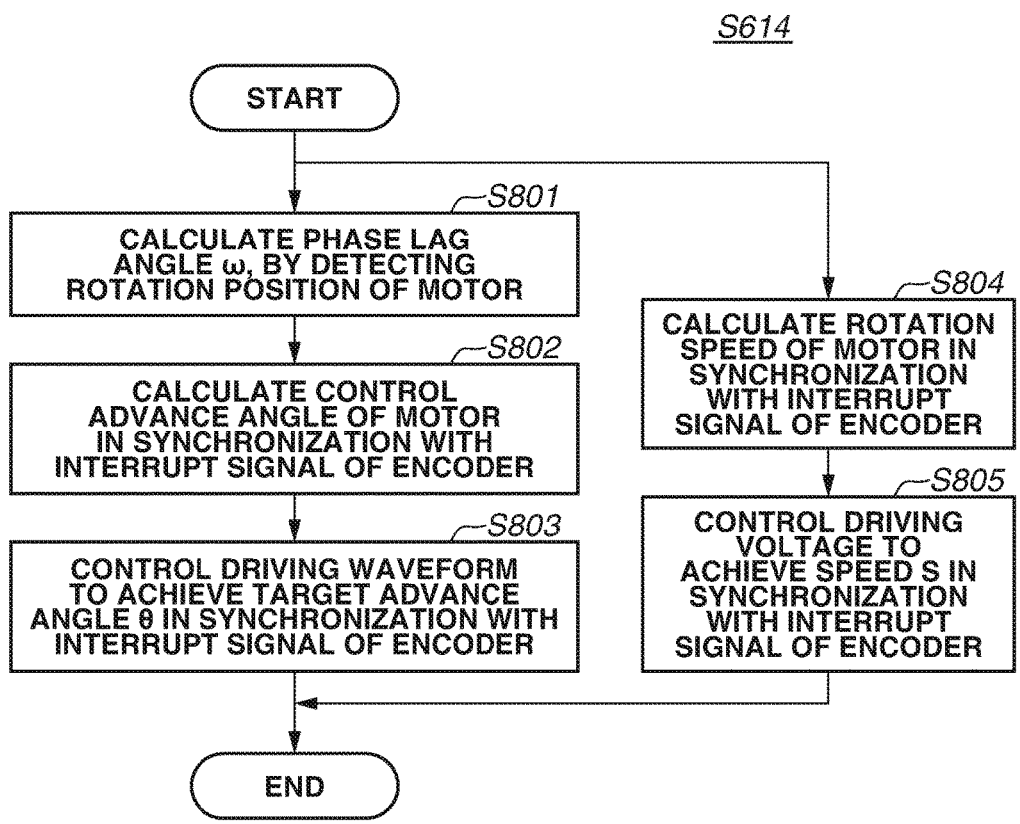
FIG. 8 is a flowchart illustrating advance angle control and voltage feedback control according to one or more exemplary embodiments of the subject disclosure.

Next, the parallel processing (step S614) of the advance angle control and the speed feedback control will be described in detail, with reference to FIG. 8. FIG. 8 is a flowchart illustrating the advance angle control and the speed feedback control. Mainly, the CPU 108 of the control device 100 executes each step in FIG. 8.

First, in step S801, the CPU 108 calculates a phase lag angle ω, by detecting a rotation position of the stepping motor 101 in synchronization with an interrupt signal of the encoder obtained from the encoder circuit 107. The calculated phase lag angle ω occurs due to a factor such as a back electromotive force of the rotating stepping motor 101.

Next, in step S802, the CPU 108 calculates a control advance angle of the stepping motor 101 in synchronization with an interrupt signal of the encoder. In the present exemplary embodiment, the CPU 108 calculates a phase difference o-e between the phase lag angle ω and the target advance angle θ, as the control advance angle. Subsequently, in step S803, the CPU 108 controls a driving waveform to achieve the target advance angle θ in synchronization with an interrupt signal of the encoder. In other words, the CPU 108 performs the advance angle control to maintain the state of the target advance angle θ, by controlling the driving waveform to compensate for the phase difference ω-θ. Specifically, the CPU 108 controls the waveform phase of the sine wave generator 109 to advance the phase of the control waveform by the phase difference ω-θ before the timing of the generation of the next interrupt signal of the encoder. In this way, the CPU 108 (the advance angle control unit 108d) controls the advance angle of the control waveform to be the target advance angle at the timing depending on the detection signal for the rotation position of the rotor.

Figure 9:
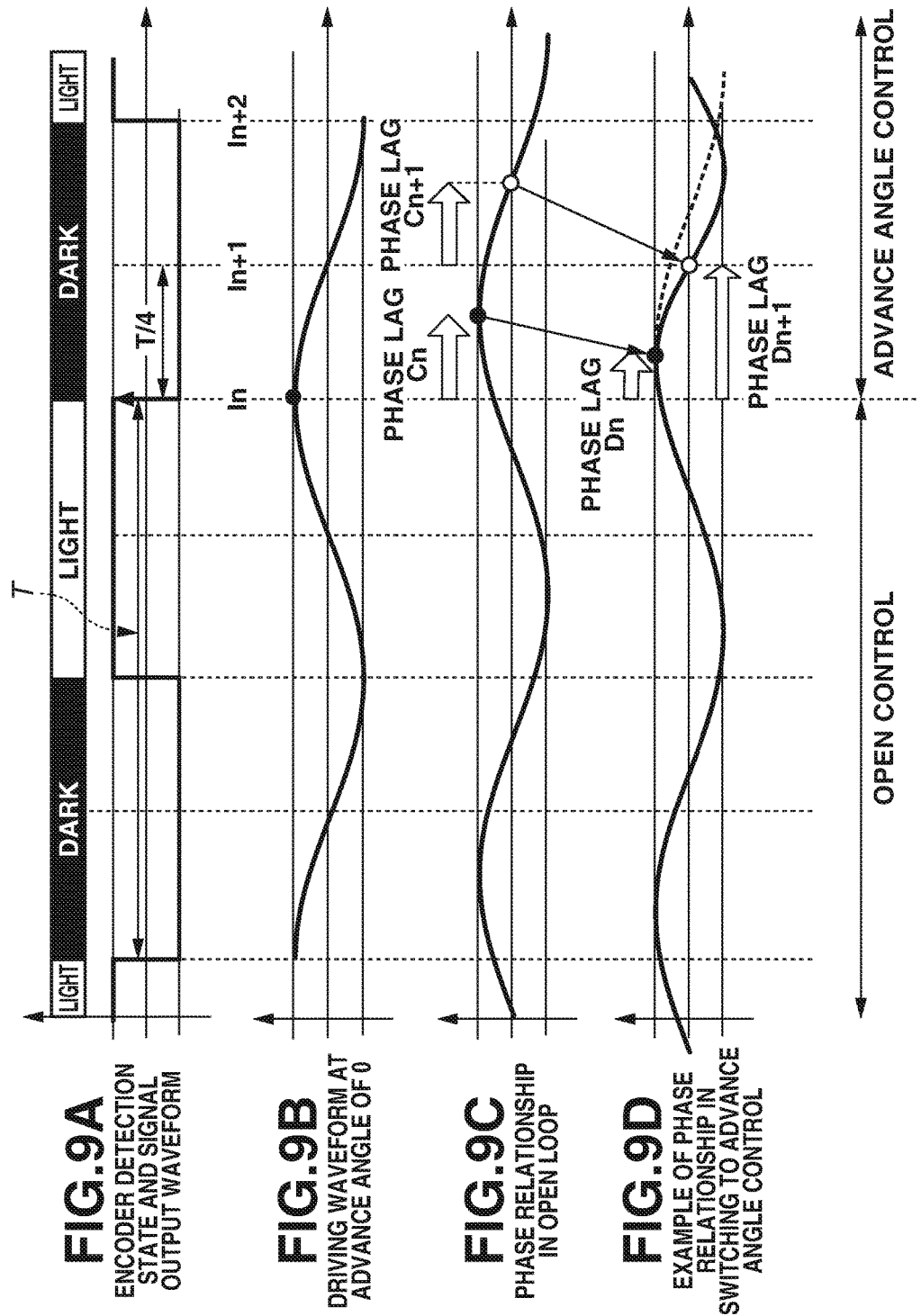
FIGS. 9A, 9B, 9C and 9D illustrate advance angle control according to an exemplary embodiment of the subject disclosure.

Here, an example of the advance angle control in step S803 in FIG. 8 will be described with reference to FIGS. 9A, 9B, 9C, and 9D. FIGS. 9A, 9B, 9C, and 9D illustrate the advance angle control. FIG. 9A illustrates an output waveform of a signal of the encoder attached to the rotor shaft 102 of the stepping motor 101. The CPU 108 performs phase detection and phase control for the driving waveform, at the timing of lightness/darkness, or lightness/darkness switching, of the encoder. FIG. 9B illustrates an example the driving waveform in a case where the advance angle is 0 degree. FIG. 9C illustrates an example of the driving waveform based on open loop control. FIG. 9C illustrates a delay occurring in the phase as compared with the driving waveform in FIG. 9B. FIG. 9D illustrates a driving waveform in a case where the open loop control in FIG. 9C is switched to the advance angle control.

The waveform in FIG. 9B represents an ideal driving waveform (the advance angle of 0 degree) with no delay in electric current. The waveform illustrated in FIG. 9C represents a driving waveform in the open loop control. According to the waveform in FIG. 9C, a phase lag of Cn occurs at timing In of switching from lightness to darkness in FIG. 9A, and a phase lag of Cn+1 occurs at timing In+1 after a quarter period. As illustrated in FIG. 9D, in a case where the open loop control is switched to the advance angle control at the timing In, the CPU 108 controls the period of the control waveform in such a manner that the control waveform becomes a target phase after a quarter period (In+1). For example, if the target phase is the advance angle of 0 degree, the CPU 108 performs control to change the period of the control waveform in a time period corresponding to a quarter period, in such a manner that the phase lag Dn+1 becomes 0 degree. If the phase of the control waveform is advanced immediately after the timing In, the waveform becomes discontinuous, which causes a problem such as vibration, abnormal noise, or step-out of the motor. Therefore, in this example, the CPU 108 controls the period of the control waveform, thereby performing control to align the phases in a predetermined period of time, e.g., the quarter period in which no problem occurs. In the present exemplary embodiment, the advance angle control is described with reference to FIGS. 9A, 9B, 9C, and 9D, by using the case where the advance angle control is performed to bring the advance angle to 0 degree, as an example. However, in a case where the advance angle control is performed to result in a state where only a phase lag of δ remains, the advance angle control may be performed using the advance angle δ.

In step S804 and step S805 in FIG. 8, the CPU 108 executes speed control based on voltage feedback (the speed feedback control), simultaneously with (in parallel with) the above-described advance angle control, thereby controlling rotation speed of the stepping motor 101 to be the speed S. Specifically, first, in step S804, the CPU 108 measures a detection interval between interrupt signals of the encoder (in synchronization with an interrupt signal of the encoder), thereby calculating a rotation speed of the stepping motor 101. In this way, the CPU 108 (the rotation speed detection unit 108a) detects a rotation speed of the rotor, with a period of generation of a detection signal for a rotation position of the stepping motor 101. Subsequently, in step S805, the CPU 108 controls the driving voltage in such a manner that the rotation speed of the stepping motor 101 becomes the speed S, synchronization with an interrupt signal of the encoder. In other words, the CPU 108 controls the rotation speed of the stepping motor 101, by reflecting a deviation amount between the rotation speed calculated in step S804 and the target speed S the driving voltage. As described above, the advance angle control and the feedback control of the driving speed are performed in synchronization with the interrupt signal of the encoder.

Figure 10:
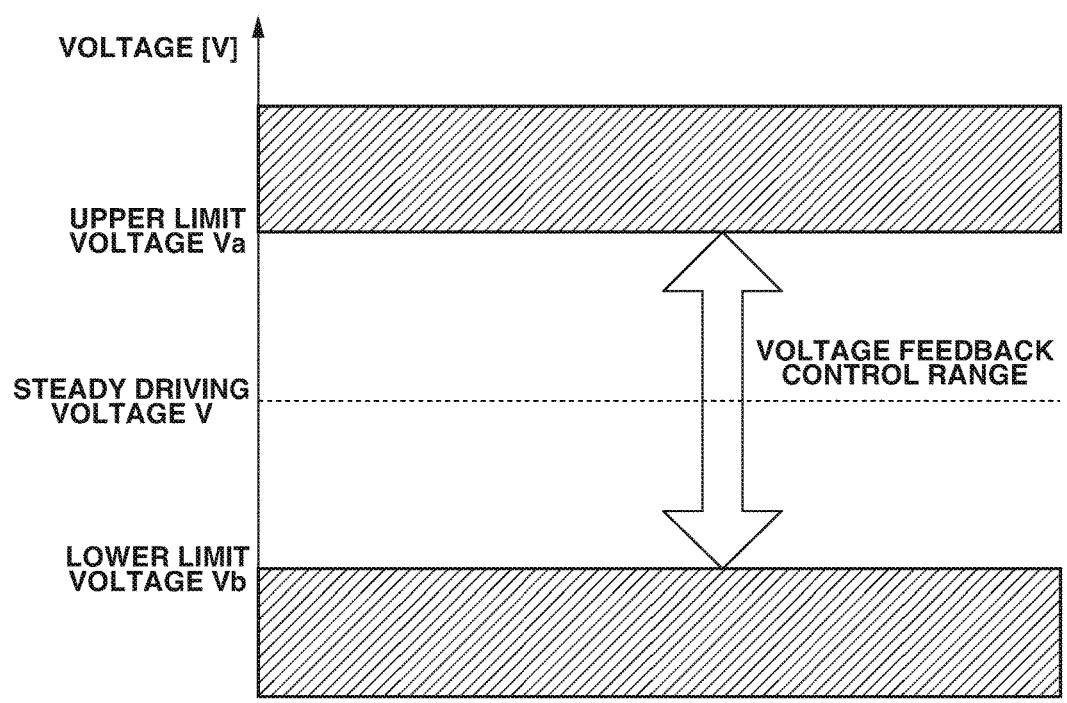
FIG. 10 illustrates speed control based on voltage feedback according to an exemplary embodiment of the subject disclosure.

Here, the speed control based on the voltage feedback will be described with reference to FIG. 10. FIG. 10 illustrates the speed control based on the voltage feedback. Assume that the steady driving voltage in driving the stepping motor 101 at a predetermined target speed S is a steady driving voltage V. The steady driving voltage V is a steady driving voltage to be a median value (the center between an upper limit voltage Va and a lower limit voltage Vb) of a control range of driving voltages set by the CPU 108. The CPU 108 performs control in such a manner that a deviation between the target speed S and the current rotation speed approaches 0, by fine-tuning the voltage around the steady driving voltage V.

The CPU 108 calculates an advance angle value depending on the target speed, based on extracted mathematical expression data. When the CPU 108 performs the advance angle control to achieve the calculated advance angle, the stepping motor 101 rotates at a speed close to the target speed at the steady driving voltage V0. In this process, the CPU 108 calculates an actual driving speed (a rotation speed) of the stepping motor 101 in step S804 in FIG. 8, and if there is a deviation between the actual driving speed and the target speed, the CPU 108 controls the driving speed by changing the driving voltage in step S805. In this way, based on the mathematical expression data corresponding to the advance-angle-to-speed data stored in the memory 121, the CPU 108 (the voltage control unit 108e) controls the driving voltage in such a manner that the deviation between the speed S and the rotation speed calculated in step S804 falls within a predetermined threshold range.

In a case where the speed control of the stepping motor 101 based on the driving voltage is performed, a limited range is set for the driving voltage, for a reason such as the electric power design of a system. In the example illustrated in FIG. 10, the upper limit voltage Va and the lower limit voltage Vb are provided for the driving voltage. The CPU 108 controls the stepping motor 101 to achieve the target speed while changing the driving voltage between the upper limit voltage Va and the lower limit voltage Vb.

In the present exemplary embodiment, the voltage control unit 108e controls the driving voltage, based on the information (information indicating the relationship between the advance angle and the rotation speed) stored in the memory 121, the rotation speed of the rotor, and the target rotation speed. Preferably, the information indicating the relationship between the advance angle and the rotation speed is a plurality of loci each indicating the relationship between the advance angle and the rotation speed at each driving voltage (using the driving voltage as a parameter). More preferably, in the first control state (the state 0 or the state 2), the advance angle control unit 108d sets the target rotation speed by controlling the advance angle along one locus among the plurality of loci. Further, in the second control state (the state 1), the voltage control unit 108e sets the target rotation speed by controlling the driving voltage in the state where the advance angle is fixed. More preferably, the first control state is a control state where the absolute value of the slope of a locus (a change in rotation speed with respect to a change in advance angle, i.e., the change rate α) is more than a first predetermined value, and the second control state is a control state where the absolute value of the slope of a locus is not greater than the first predetermined value.

In this way, using the advance angle control and the speed control based on the voltage together, the control device 100 of the present exemplary embodiment can perform the speed control based on an arbitrary speed, while achieving high-speed driving unattainable by the open loop control. Moreover, because unevenness in ambient temperature and individual difference can also be absorbed within a voltage control range, it is possible to perform highly precise speed control, which is unattainable if only the advance-angle-to-speed data based on actual measurement is used.

Next, a second exemplary embodiment of the present disclosure will be described. In the first exemplary embodiment, the advance-angle-to-speed data is stored as a table in the memory (the storage unit) 121, but a data amount may become large in such a configuration. Therefore, in the control device 100 of the present exemplary embodiment, the memory 121 stores the advance-angle-to-speed data in a limited speed range beforehand, and the CPU 108 calculates a target advance angle by using the advance-angle-to-speed data stored in the memory 121. Such a configuration can reduce the data amount to be used for the calculation of the target advance angle. In the present exemplary embodiment, configuration and operation similar to those in the first exemplary embodiment will not be described.

Figure 11:
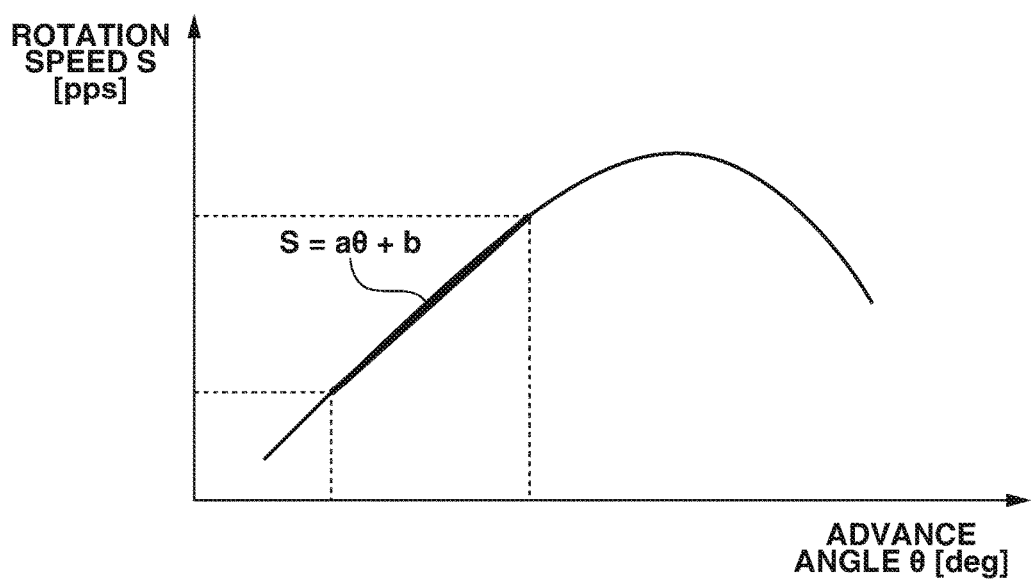
FIG. 11 illustrates an approximate expression indicating a relationship between an advance angle and a rotation speed according to one or more exemplary embodiments of the subject disclosure.

FIG. 11 illustrates an approximate expression indicating a relationship between an advance angle and a rotation speed of the stepping motor 101 in the present exemplary embodiment. In the present exemplary embodiment, for the advance-angle-to-speed data illustrated in FIG. 4, a linear approximation is performed as illustrated in FIG. 11, and the relationship between the rotation speed S and the advance angle θ is mathematicised using constants a and b, as expressed in the following expression (1).

$$S+a\theta+b \quad (1)$$

Specifically, within a range controllable driving speeds, the linear approximation is performed on the advance-angle-to-speed data, which has a high average change rate in the advance-angle-to-speed characteristic curve, and which is in an area with relatively high linearity. The result obtained by the calculation is stored for each voltage. The CPU 108 (an advance angle calculation unit) then calculates an advance angle value of a control waveform depending on the speed S, as a target advance angle. This advance angle value is calculated based on correlation information, which indicates the correspondence between an advance angle and a rotation speed in a predetermined range of rotation speeds of the stepping motor 101, and which is stored beforehand in the memory 121.

Figure 12:
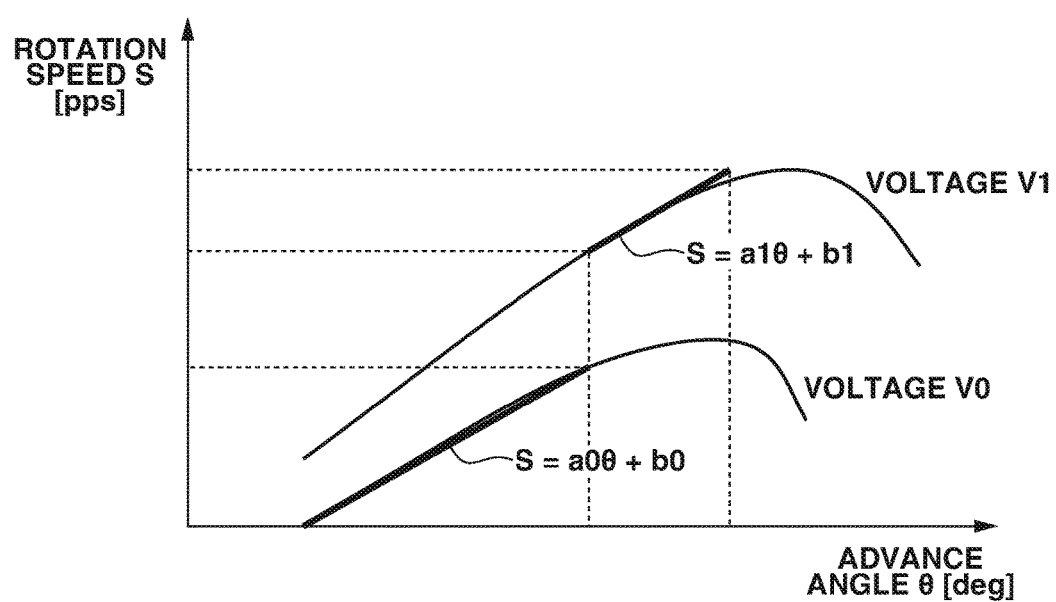
FIG. 12 illustrates an approximate expression indicating a relationship between an advance angle and a speed at each driving voltage according to an exemplary embodiment of the subject disclosure.

FIG. 12 illustrates an example of a linear approximation performed on the advance-angle-to-speed data at each of the driving voltages in FIG. 5. In a case where only one piece of advance-angle-to-speed data is stored, a controllable driving speed and a settable advance angle are limited as illustrated in FIG. 11. However, a dynamic range of speed can be increased by combining a plurality of approximate expressions for advance-angle-to-speed data for varied driving voltages, as illustrated in FIG. 12. In other words, according to the control device 100 of the present exemplary embodiment, the driving speed can be controlled even if the voltage is changed at a fixed predetermined advance angle, or even if the advance angle is changed at a fixed predetermined voltage.

Figure 13:
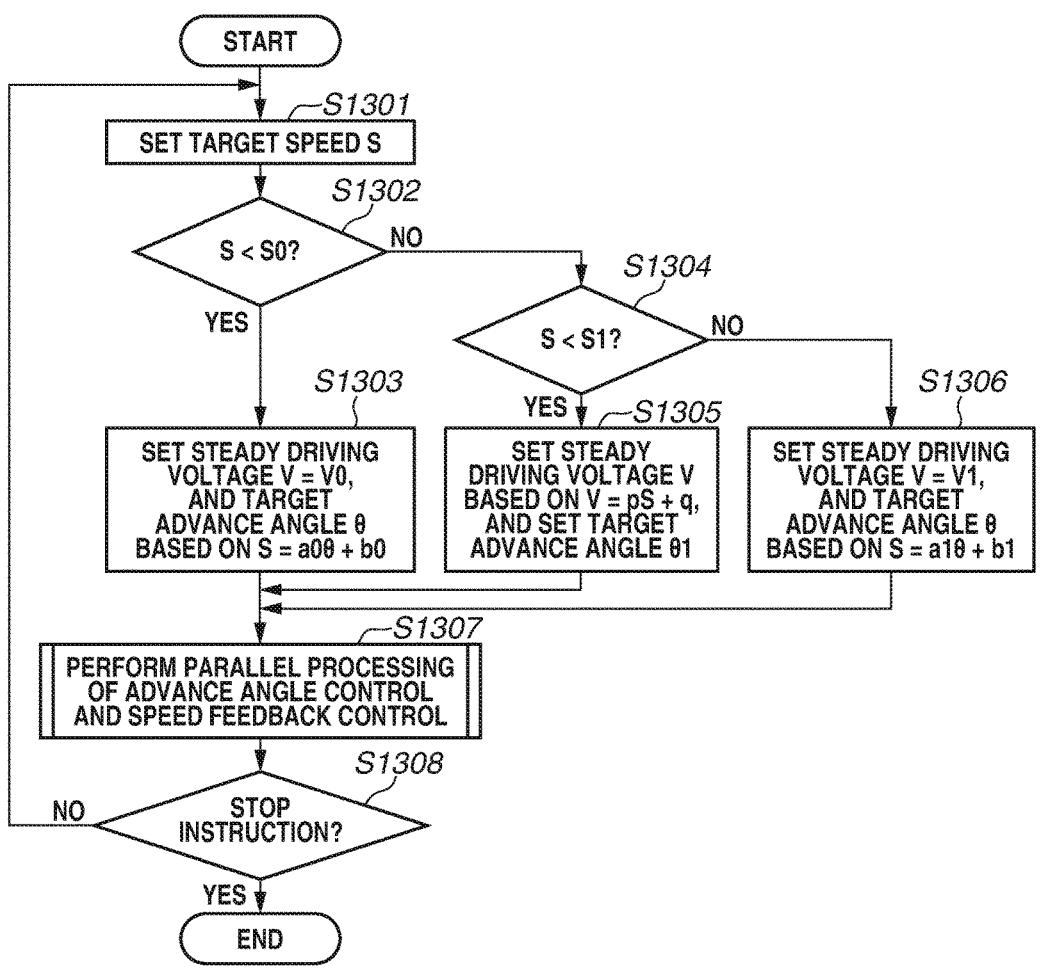
FIG. 13 is a flowchart illustrating a control method according to an exemplary embodiment of the subject disclosure.
Figure 14A:
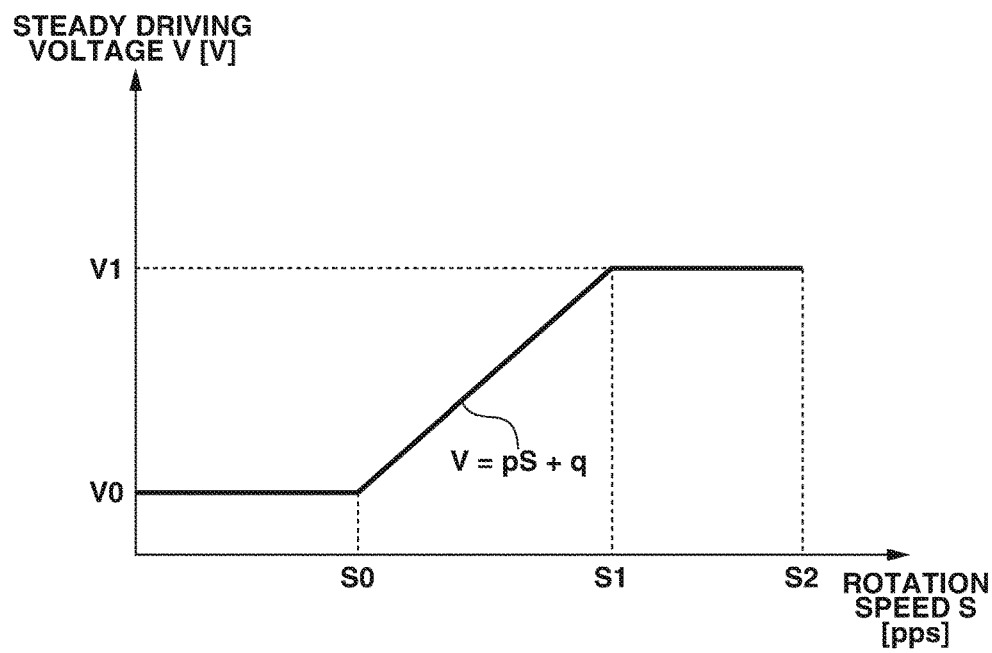
FIGS. 14A and 14B illustrate a control method according to an exemplary embodiment of the subject disclosure.
Figure 14B:
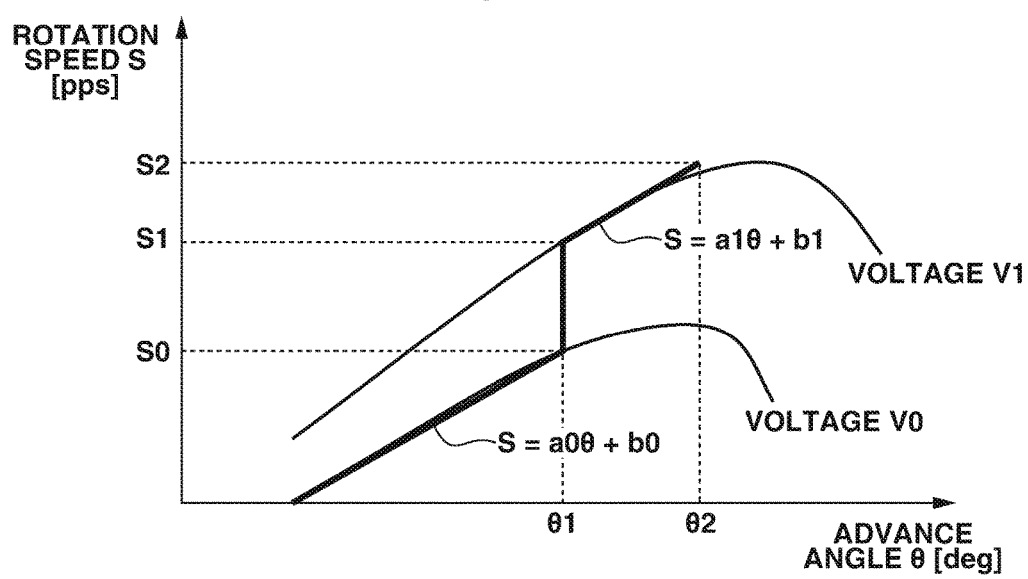

Next, operation (a control method) of the control device 100 in the present exemplary embodiment will be described with reference to FIG. 13 as well as FIGS. 14A and 14B. FIG. 13 is a flowchart illustrating the control method in the present exemplary embodiment. Mainly, the CPU 108 of the control device 100 executes each step in FIG. 13. FIGS. 14A and 14B illustrate the control method in the present exemplary embodiment. FIG. 14A illustrates the relationship between the rotation speed S and the steady driving voltage V, and FIG. 14B illustrates the relationship between the advance angle θ and the rotation speed S.

First, in step S1301, the CPU 108 sets the target speed S. Subsequently, in step S1302 to step S1306, the CPU 108 determines the steady driving voltage V and the target advance angle θ according to FIGS. 14A and 14B. The steady driving voltage V is a steady driving voltage for driving the stepping motor 101 at a predetermined target speed, in the speed feedback control.

In step S1302, the CPU 108 determines whether the target speed S is less than a speed S0. If the target speed S is less than the speed S0 (YES in step S1302), the operation proceeds to step S1303. In step S1303, the CPU 108 sets the steady driving voltage V at V0, according to FIG. 14A. The CPU 108 also sets the target advance angle θ based on a straight line S=a0θ+b0, according to FIG. 14B.

On the other hand, if the target speed S is the speed S0 or more (NO in step S1302), the operation proceeds to step S1304. In step S1304, the CPU 108 determines whether the target speed S is less than a speed S1 (S0<S1). If the target speed S is less than the speed S1 (YES in step S1304), the operation proceeds to step S1305. In step S1305, the CPU 108 sets the steady driving voltage V based on V=pS+q, according to FIG. 14A. The CPU 108 also sets the target advance angle θ at the advance angle θ1, according to FIG. 14B.

On the other hand, if the target speed S is the speed S1 or more (NO in step S1304), the operation proceeds to step S1306. In step S1306, the CPU 108 sets the steady driving voltage V at V1, according to FIG. 14A. The CPU 108 also sets the target advance angle θ based on a straight line S=a1θ+b1, according to FIG. 14B.

As described above, the CPU 108 changes the speed by changing the advance angle while fixing the steady driving voltage, according to the relationship illustrated in each of FIGS. 14A and 14B, in a case where the target speed S is less than the speed S0, or not less than the speed S1. On the other hand, in a case where the target speed S is between the speed S0 and the speed S1 inclusive, the CPU 108 changes the speed by changing the steady driving voltage while fixing the advance angle. An approximate straight line of the advance-angle-to-speed data is stored in the memory 121 connected to the CPU 108, based on the average change rate. Specifically, a part where the average change rate is more than a predetermined value is stored as the approximate straight line. In other words, if the average change rate of the advance-angle-to-speed data is small, the rotation speed of the stepping motor 101 is controlled by changing the steady driving voltage while fixing the target advance angle θ at θ1. Afterward, the steady driving voltage V is adjusted, and when the target speed reaches the speed S1 on S=a1θ+b1, the rotation speed of the stepping motor 101 is controlled by adjusting the advance angle while fixing the steady driving voltage at V1.

Upon completion of any of step S1303, step S1305, and step S1306, the operation proceeds to step S1307. In step S1307, the CPU 108 performs parallel processing of advance angle control and speed feedback control, thereby controlling the rotation speed of the stepping motor 101 to be the target speed S. Step S1307 is similar to step S614 of the first exemplary embodiment described with reference to FIG. 8 and therefore will not be described. Subsequently, in step S1308, the CPU 108 determines whether a stop instruction is received. If the CPU 108 determines that a stop instruction is not received (NO in step S1308), the operation returns to step S1301, and the series of steps are repeated. On the other hand, if a stop instruction is received (YES in step S1308), the CPU 108 stops the stepping motor 101.

In the present exemplary embodiment, the first control state is a control state where the linearity of a locus is less than a second predetermined value, and the second control state is a control state where the linearity of a locus is more than the second predetermined value. Preferably, the memory 121 stores each of the plurality of loci as each of a plurality of approximate expressions. More preferably, the memory 121 stores each of the plurality of loci as each of a plurality of linear approximate expressions.

Next, a third exemplary embodiment of the present disclosure will be described. In the present exemplary embodiment, description similar to that of the first exemplary embodiment will be omitted.

If a speed is changed while an advance angle of a stepping motor is gradually changed, it takes some time to reach a target advance angle. In this case, the advance angle gradually changes and the speed also gradually changes accordingly. However, when a motor is accelerated using a system employing advance angle control and voltage control, the speed state of a control target is unstable it a target speed of the voltage control is changed according to a target advance angle. This induces overshoot with respect to the target speed. As a result, driving noise and degradation in controllability occur. In the present exemplary embodiment, a control device for a stepping motor for reducing the occurrence of the overshoot will be described.

Figure 15:
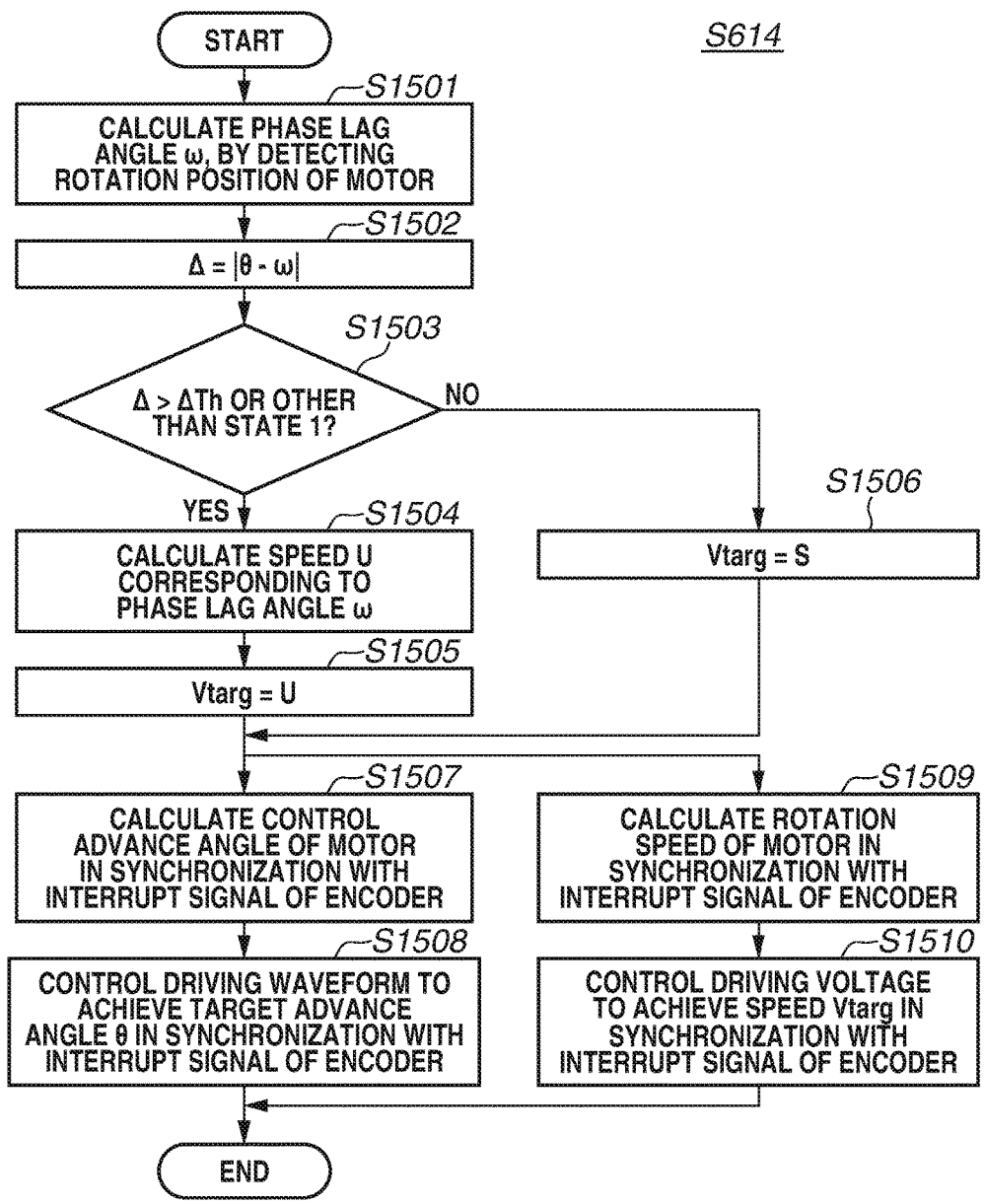
FIG. 15 is a flowchart illustrating advance angle control and voltage feedback control according to an exemplary embodiment of the subject disclosure.

First, the parallel processing (step S614) of the advance angle control and the speed feedback control in the present exemplary embodiment will be described with reference to FIG. 15. FIG. 15 is a flowchart illustrating the advance angle control and the speed feedback control. Mainly, the CPU 108 of the control device 100 executes each step in FIG. 15.

First, in step S1501, the CPU 108 calculates a phase lag angle ω, by detecting a rotation position of the stepping motor 101 in synchronization with an interrupt signal of the encoder obtained from the encoder circuit 107. The calculated phase lag angle ω occurs due to a factor such as a back electromotive force of the rotating stepping motor 101.

Next, in step S1502, the CPU 108 calculates an absolute value Δ indicating the difference between the target advance angle θ and the phase lag angle ω. Subsequently, in step S1503, the CPU 108 determines whether the difference absolute value Δ is more than a predetermined value ΔTh. The CPU 108 also determines whether the control state is a control state other than the state 1 (the second control state). If the difference absolute value Δ is more than the predetermined value ΔTh or if the control state is a control state other than the state 1 (YES in step S1503), the processing proceeds to step S1504.

In step S1504, the CPU 108 calculates a rotation speed (a speed U) of the stepping motor 101 corresponding to the phase lag angle ω. The speed U can be determined, by referring to the rotation speed corresponding to the phase lag angle ω, from the advance-angle-to-speed data illustrated in FIG. 7 and stored in the memory 121 as the table data. Next, in step S1505, the CPU 108 sets the speed U (a second target rotation speed) as a target speed Vtarg of the speed feedback control. If the difference absolute value Δ is more than the predetermined value ΔTh in step S1503, a response may be attenuated by reducing the servo gain of the speed feedback.

On the other hand, if the difference absolute value Δ is equal to or less than the predetermined value ΔTh and the control state is the state 1 (NO in step S1503), the processing proceeds to step S1506. In step S1506, the CPU 108 sets the speed S (a first target rotation speed) as the target speed Vtarg of the speed feedback control.

Subsequent step S1507 to step S1509 are similar to step S802 to step S804 in FIG. 8. In step S1510, in synchronization with an interrupt signal of the encoder, the CPU 108 controls the driving voltage in such a manner that the rotation speed of the stepping motor 101 becomes the target speed Vtarg. In other words, the CPU 108 controls the rotation speed of the stepping motor 101, by reflecting, in the driving voltage, a deviation amount between the rotation speed calculated in step S1509 and the target speed Vtarg. According to the present exemplary embodiment, the target speed Vtarg, which is provided for speed feedback processing, can be gradually changed according to changes in the advance angle α that is reaching the target advance angle θ, by repeating the execution of the processing in the flowchart illustrated in FIG. 15.

Figure 16A:
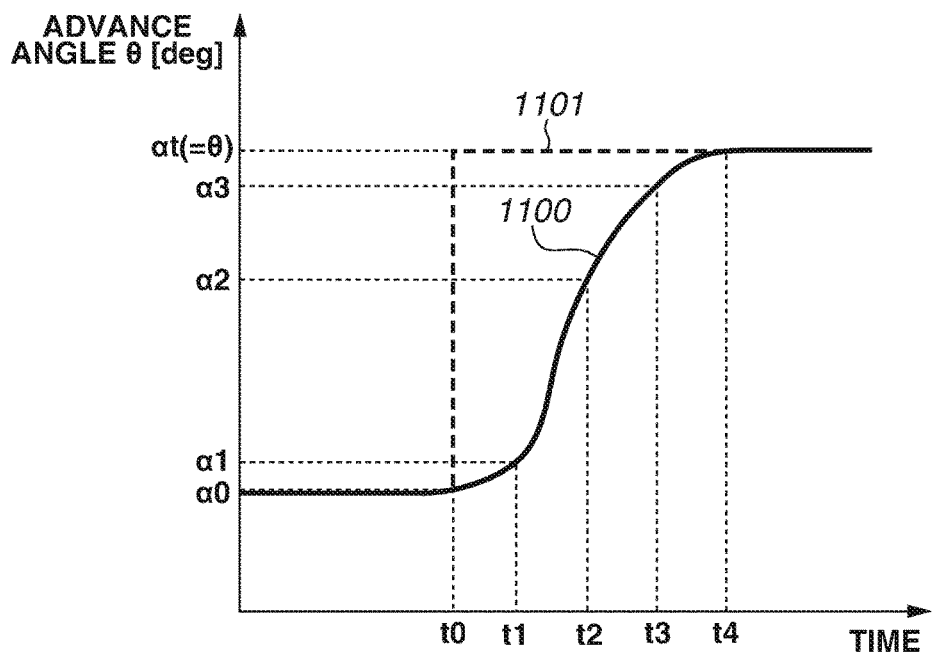
FIGS. 16A and 16B illustrate advance angle control according to an exemplary embodiment of the subject disclosure.
Figure 16B:
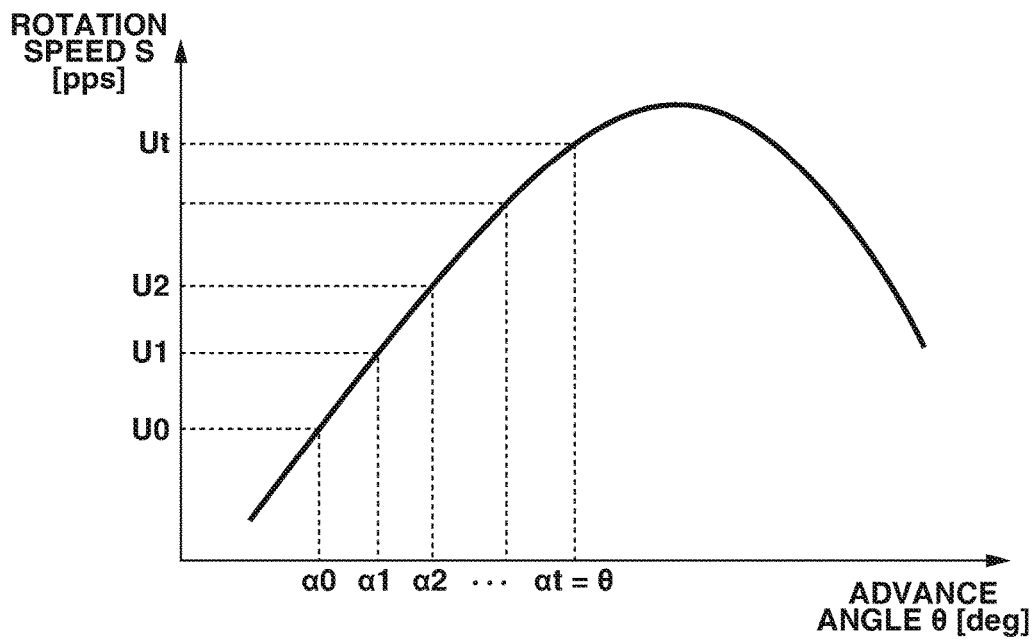

FIGS. 16A and 16B illustrate the advance angle control in the present exemplary embodiment. FIG. 16A illustrates the relationship between the time and the advance angle. The horizontal axis indicates the time, and the vertical axis indicates the advance angle. In a case where the target advance angle θ is changed at a time t0 as indicated by a dashed line 1101, the detected phase lag angle ω changes as indicated by a solid line 1100, so as to reach the target advance angle θ. FIG. 16B illustrates the above-described relationship between the advance angle and the speed. By using the table data illustrated in FIG. 16B, the rotation speed (the speed U) of the stepping motor 101 corresponding to the phase lag angle ω can be calculated in step S1504 in FIG. 15 described above. The rotation speed (the speed U0 to a speed Ut) of the stepping motor 101 is determined according to a change in the advance angle, by referring to the table data in FIG. 16B. The speed feedback control is performed using the determined rotation speed as the target speed Vtarg. This makes it possible to implement stable control, such as control for preventing the speed of a control target from overshooting the target speed.

In the present exemplary embodiment, the advance angle control unit 108d changes the first target rotation speed (the speed S) that is the target rotation speed of the rotor to the second target rotation speed (the speed U), based on the target advance angle and the advance angle detected by the advance angle detection unit 108b. Preferably, in a case where the difference between the target advance angle and the advance angle detected by the advance angle detection unit 108b is more than a third predetermined value, the advance angle control unit 108d changes the first target rotation speed to the second target rotation speed. On the other hand, in a case where the difference is less than the third predetermined value, the advance angle control unit 108d sets the first target rotation speed as the second target rotation speed. More preferably, in a case where the difference between the target advance angle and the advance angle detected by the advance angle detection unit 108b is more than the third predetermined value, the voltage control unit 108e attenuates the feedback gain. Further, preferably, the advance angle control unit 108d sets the second target rotation speed at the timing detection of the detection signal.

Other Embodiments

Embodiment (s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-093591, filed May 10, 2017, which is hereby incorporated by reference herein in its entirety.

What is claimed is:

1. A control device comprising:
   at least one processor which functions as:
   a generation unit configured to generate a detection signal for a rotation position of a rotation portion of a stepping motor;
   a rotation speed detection unit configured to detect a rotation speed of the rotation portion;
   an advance angle detection unit configured to detect an advance angle based on the detection signal and a control waveform;
   a storage unit configured to store information indicating a plurality of loci each indicating a relationship between the advance angle and the rotation speed at each driving voltage;
   a target advance angle calculation unit configured to calculate a target advance angle depending on a target rotation speed of the rotation portion, based on the information stored in the storage unit;
   an advance angle control unit configured to control the advance angle to be the target advance angle;
   a voltage control unit configured to control the driving voltage of the stepping motor, based on the information stored in the storage unit; and
   a switching unit configured to switch between a first control state and a second control state,
   wherein the target advance angle calculation unit sets a target rotation speed by controlling the advance angle along one locus among the plurality of loci, in the first control state,
   wherein the voltage control unit sets the target rotation speed by controlling the voltage in a state where the advance angle is fixed, in the second control state, and
   wherein the switching unit switches between the first control state and the second control state, according to the locus, the target advance angle, and the driving voltage.

2. The control device according to claim 1, wherein the voltage control unit controls the driving voltage, based on the information stored in the storage unit, the rotation speed of the rotation portion, and the target rotation speed, in the second control state.

3. The control device according to claim 2, wherein the voltage control unit controls the driving voltage to allow a deviation between the target rotation speed of the rotation portion and the detected rotation speed to fall within a predetermined range, in the second control state.

4. The control device according to claim 1,
   wherein the first control state is a control state where an absolute value of slope of the locus is more than a first predetermined value, and
   wherein the second control state is a control state where the absolute value of the slope of the locus is less than the first predetermined value.

5. The control device according to claim 1,
   wherein the first control state is a control state where linearity of the locus is less than a second predetermined value, and
   wherein the second control state is a control state where the linearity of the locus is more than the second predetermined value.

6. The control device according to claim 1, wherein the storage unit stores each of the plurality of loci as each of a plurality of approximate expressions.

7. The control device according to claim 1, wherein the rotation speed detection unit detects the rotation speed of the rotation portion, with a period of generation of the detection signal by the generation unit.

8. The control device according to claim 1, wherein the processor includes a circuitry.

9. A control device comprising:
   at least one processor which functions as:
   a generation unit configured to generate a detection signal for a rotation position of a rotation portion of a stepping motor;
   a rotation speed detection unit configured to detect a rotation speed of the rotation portion;
   an advance angle detection unit configured to detect an advance angle based on the detection signal and a control waveform;
   a storage unit configured to store information indicating a relationship between the advance angle and the rotation speed at each driving voltage;
   a target advance angle calculation unit configured to calculate a target advance angle depending on a target rotation speed of the rotation portion, based on the information stored in the storage unit;
   an advance angle control unit configured to control the advance angle to be the target advance angle; and
   a voltage control unit configured to control the driving voltage of the stepping motor, based on the information stored in the storage unit,
   wherein the advance angle control unit changes a first target rotation speed that is the target rotation speed of the rotation portion, to a second target rotation speed, based on the target advance angle and the advance angle detected by the advance angle detection unit.

10. The control device according to claim 9,
    wherein the advance angle control unit changes the first target rotation speed to the second target rotation speed, in a case where a difference between the target advance angle and the advance angle detected by the advance angle detection unit is more than a third predetermined value, and
    wherein the advance angle control unit sets the first target rotation speed as the second target rotation speed, in a case where the difference is less than the third predetermined value.

11. The control device according to claim 10, wherein the voltage control unit attenuates a feedback gain, in a case where the difference between the target advance angle and the advance angle detected by the advance angle detection unit is more than the third predetermined value.

12. The control device according to claim 10, wherein advance angle control unit sets the second target rotation speed at timing of detection of the detection signal.

13. The control device according to claim 9,
wherein the information indicating the relationship between the advance angle and the rotation speed indicates a plurality of loci,
wherein the advance angle control unit sets a target rotation speed by controlling the advance angle along one locus among the plurality of loci, in a first control state, and
wherein the voltage control unit sets the target rotation speed by controlling the driving voltage in a state where the advance angle is fixed, in a second control state.

14. The control device according to claim 13, further comprising a switching unit configured to switch between the first control state and the second control state, according to the locus, the target advance angle, and the driving voltage.

15. An optical apparatus comprising:
a stepping motor;
a driven member configured to be driven by the stepping motor; and
a control device configured to control the stepping motor,
wherein the control device comprising at least one processor which functions as:
a generation unit configured to generate a detection signal for a rotation position of a rotation portion of the stepping motor;
a rotation speed detection unit configured to detect a rotation speed of the rotation portion;
an advance angle detection unit configured to detect an advance angle based on the detection signal and a control waveform;
a storage unit configured to store information indicating a plurality of loci each indicating a relationship between the advance angle and the rotation speed at each driving voltage;
a target advance angle calculation unit configured to calculate a target advance angle depending on a target rotation speed of the rotation portion, based on the information stored in the storage unit;
an advance angle control unit configured to control the advance angle to be the target advance angle;
a voltage control unit configured to control the driving voltage of the stepping motor, based on the information stored in the storage unit; and
a switching unit configured to switch between a first control state and a second control state,
wherein the target advance angle calculation unit sets a target rotation speed by controlling the advance angle along one locus among the plurality of loci, in the first control state,
wherein the voltage control unit sets the target rotation speed by controlling the voltage in a state where the advance angle is fixed, in the second control state, and
wherein the switching unit switches between the first control state and the second control state, according to the locus, the target advance angle, and the driving voltage.

16. An optical apparatus comprising:
a stepping motor;
a driven member configured to be driven by the stepping motor; and
a control device configured to control the stepping motor,
wherein the control device comprising at least one processor which functions as:
a generation unit configured to generate a detection signal for a rotation position of a rotation portion of the stepping motor;
a rotation speed detection unit configured to detect a rotation speed of the rotation portion;
an advance angle detection unit configured to detect an advance angle based on the detection signal and a control waveform;
a storage unit configured to store information indicating a relationship between the advance angle and the rotation speed at each driving voltage;
a target advance angle calculation unit configured to calculate a target advance angle depending on a target rotation speed of the rotation portion, based on the information stored in the storage unit;
an advance angle control unit configured to control the advance angle to be the target advance angle; and
a voltage control unit configured to control the driving voltage of the stepping motor, based on the information stored in the storage unit,
wherein the advance angle control unit changes a first target rotation speed that is the target rotation speed of the rotation portion, to a second target rotation speed, based on the target advance angle and the advance angle detected by the advance angle detection unit.

17. A control method comprising:
generating a detection signal for a rotation position of a rotation portion of a stepping motor;
detecting a rotation speed of the rotation portion;
detecting an advance angle based on the detection signal and a control waveform;
calculating a target advance angle depending on a target rotation speed of the rotation portion, based on information indicating a plurality of loci each indicating a relationship between the advance angle and the rotation speed at each driving voltage and stored in the storage unit;
controlling the advance angle to be the target advance angle;
controlling the driving voltage of the stepping motor, based on the information stored in the storage unit; and
switching between a first control state and a second control state,
wherein the controlling the advance angle includes setting a target rotation speed by controlling the advance angle along one locus among the plurality of loci, in the first control state,
wherein the controlling the driving voltage includes setting the target rotation speed by controlling the voltage in a state where the advance angle is fixed, in the second control state, and
wherein the switching includes switching between the first control state and the second control state, according to at least one of an absolute value of slope of the locus and linearity of the locus.

18. A machine-readable medium having a program causing the machine to execute:
generating a detection signal for a rotation position of a rotation portion of a stepping motor;
detecting a rotation speed of the rotation portion;
detecting an advance angle based on the detection signal and a control waveform;
calculating a target advance angle depending on a target rotation speed of the rotation portion, based on information indicating a plurality of loci each indicating a relationship between the advance angle and the rotation speed at each driving voltage and stored in the storage unit;

controlling the advance angle to be the target advance angle;

controlling the driving voltage the stepping motor, based on the information stored in the storage unit; and switching between a first control state and a second control state, wherein the controlling the advance angle includes setting a target rotation speed by controlling the advance angle along one locus among the plurality of loci, in the first control state, wherein the controlling the driving voltage includes setting the target rotation speed by controlling the voltage in a state where the advance angle is fixed, in the second control state, and wherein the switching includes switching between the first control state and the second control state, according to at least one of an absolute value of slope of the locus and linearity of the locus.

19. A control method comprising:

generating a detection signal for a rotation position of a rotation portion of a stepping motor;

detecting a rotation speed of the rotation portion;

detecting an advance angle based on the detection signal and a control waveform;

calculating a target advance angle depending on a target rotation speed of the rotation portion, based on information of a locus indicating a relationship between the advance angle and the rotation speed at each driving voltage and stored in a storage unit;

controlling the advance angle to be the target advance angle; and controlling the driving voltage of the stepping motor, based on the information stored in the storage unit, wherein the controlling the advance angle changes a first target rotation speed that is the target rotation speed of the rotation portion, to a second target rotation speed, based on the target advance angle and the detected advance angle.

20. A storage medium storing a program causing a computer to execute:

generating a detection signal for a rotation position of a rotation portion of a stepping motor;

detecting a rotation speed of the rotation portion;

detecting an advance angle based on the detection signal and a control waveform;

calculating a target advance angle depending on a target rotation speed of the rotation portion, based on information of a locus indicating a relationship between the advance angle and the rotation speed at each driving voltage and stored in a storage unit;

controlling the advance angle to be the target advance angle; and controlling the driving voltage of the stepping motor, based on the information stored in the storage unit, wherein the controlling the advance angle changes a first target rotation speed that is the target rotation speed of the rotation portion, to a second target rotation speed, based on the target advance angle and the detected advance angle.

* * * * *